(12) United States Patent
Ji et al.

(10) Patent No.: US 9,704,261 B2
(45) Date of Patent: Jul. 11, 2017

(54) IMAGE SEGMENTATION PROCESSING METHOD AND APPARATUS

(71) Applicant: Huawei Technologies Co., Ltd., Shenzhen (CN)

(72) Inventors: Mengqi Ji, Shenzhen (CN); Shan Gao, Shenzhen (CN); Haiyan Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/941,475

(22) Filed: Nov. 13, 2015

(65) Prior Publication Data

US 2016/0140724 A1 May 19, 2016

(30) Foreign Application Priority Data

Nov. 14, 2014 (CN) .......................... 2014 1 0650421

(51) Int. Cl.
*G06K 9/34* (2006.01)
*G06T 7/00* (2017.01)
(Continued)

(52) U.S. Cl.
CPC .............. *G06T 7/0087* (2013.01); *G06K 9/62* (2013.01); *G06T 7/11* (2017.01); *G06T 7/136* (2017.01);
(Continued)

(58) Field of Classification Search
CPC .......... G06K 9/00771; G06K 9/00711; G06K 9/00765; G06K 9/00744; G06K 9/6227;
(Continued)

(56) References Cited

U.S. PATENT DOCUMENTS 7,885,463 B2 * 2/2011 Zhang ...................... G06K 9/38
382/173
9,020,251 B2 4/2015 Choi et al.
(Continued)

FOREIGN PATENT DOCUMENTS

GB 2467804 A 8/2010
JP 2007004709 A 1/2007
(Continued)

OTHER PUBLICATIONS

Abedallah et al., "k Nearest Neighbor using Ensemble Clustering," DaWaK'12 Proceedings of the 14$^{th}$ international conference on Data Warehousing Knowledge Discovery, pp. 265-278, Vienna, Austria (Sep. 3-6, 2012).
(Continued)

*Primary Examiner* — Eueng-Nan Yeh
(74) *Attorney, Agent, or Firm* — Leydig, Voit & Mayer, Ltd.

(57) ABSTRACT

Embodiments of the present invention provide an image processing method and apparatus, where the method includes: determining a Gaussian mixture model of a first area in a first image, where the first area belongs to a background area of the first image, and the first image is a first frame of image in a video; determining a distance from a first pixel in a second image to the Gaussian mixture model; and when the distance from the first pixel to the Gaussian mixture model is less than or equal to a first preset threshold, determining that the first pixel belongs to a background area of the second image. In the embodiments of the present invention, an area to which a pixel belongs can be directly determined according to a distance from the pixel to a Gaussian mixture model, so that image foreground segmentation can be completed efficiently.

20 Claims, 4 Drawing Sheets

(51) Int. Cl.
*G06K 9/62* (2006.01)
*G06T 7/11* (2017.01)
*G06T 7/143* (2017.01)
*G06T 7/194* (2017.01)
*G06T 7/136* (2017.01)

(52) U.S. Cl.
CPC .............. *G06T 7/143* (2017.01); *G06T 7/194* (2017.01); *G06T 2207/10024* (2013.01)

(58) Field of Classification Search
CPC .............. G06K 9/6262; G06K 9/00751; G06K 9/00758; G06T 2207/10016; G06T 2207/20144; G06T 2207/20081; G06T 7/0097; G06T 7/0046; H04N 19/543
See application file for complete search history.

(56) References Cited

U.S. PATENT DOCUMENTS

| | | | |
|---|---|---|---|
| 2006/0291726 A1 | 12/2006 | Takeshima et al. | |
| 2007/0237393 A1 | 10/2007 | Zhang et al. | |
| 2011/0038535 A1* | 2/2011 | Wang | G06T 7/2006 382/164 |
| 2013/0101208 A1 | 4/2013 | Feris et al. | |
| 2013/0170742 A1 | 7/2013 | Dai | |
| 2014/0056471 A1* | 2/2014 | Gu | G06K 9/00208 382/103 |

FOREIGN PATENT DOCUMENTS

| | | |
|---|---|---|
| JP | 2009500752 A | 1/2009 |
| JP | 2012203680 A | 10/2012 |
| KR | 20140067295 A | 6/2014 |
| WO | 2007005839 A2 | 1/2007 |
| WO | WO 2012144957 A1 | 10/2012 |

OTHER PUBLICATIONS

Park et al., "Real-Time PTZ Camera with Detection and Classification Functionalities," The Journal of Korean Institute of Communications and Information Sciences, vol. 36, No. 2, pp. 78-85, Seoul, Korea (Feb. 2011).

Li et al., "Video Object Cut and Paste," Microsoft Research Asia (Aug. 2005).

Gupta et al., "A Gaussian-Mixture-Based Image Segmentation Algorithm," Pattern Recognition, vol. 31, Issue 3, pp. 315-325, Elsevier Science, Ltd., Great Britain (1998), (published before this application Nov. 2015).

* cited by examiner

100

| Determine a Gaussian mixture model of a first area in a first image, where the first area belongs to a background area of the first image, and the first image is a first frame of image in a video | ~ 101 |

| Determine a distance from a first pixel in a second image to the Gaussian mixture model | ~ 102 |

| When the distance from the first pixel to the Gaussian mixture model is less than or equal to a first preset threshold, determine that the first pixel belongs to a background area of the second image | ~ 103 |

# IMAGE SEGMENTATION PROCESSING METHOD AND APPARATUS

CROSS-REFERENCE

This application claims priority to Chinese Patent Application No. 201410650421.9 filed on Nov. 14, 2014, which is recited hereby as a reference with its entire entity.

TECHNICAL FIELD

The present invention relates to the field of information technologies, and in particular, to an image processing method and apparatus.

BACKGROUND

A refined foreground segmentation (image matting) technology based on a solid-color background video is widely applied in the film and television industry and applications such as simulation of a virtual scene, and plays an increasingly important role with development of emerging interaction manners such as augmented reality and video conferencing. Therefore, it is necessary to provide a highly efficient image processing method, to meet a current requirement of image foreground segmentation.

SUMMARY

Embodiments of the present invention provide an image processing method, which can directly determine a background pixel according to a distance from a pixel to a Gaussian model, so that image foreground segmentation can be completed efficiently.

According to a first aspect, an image processing method is provided, where the method includes: determining a Gaussian mixture model of a first area in a first image, where the first area belongs to a background area of the first image, and the first image is a first frame of image in a video; determining a distance from a first pixel in a second image to the Gaussian mixture model; and when the distance from the first pixel to the Gaussian mixture model is less than or equal to a first preset threshold, determining that the first pixel belongs to a background area of the second image.

With reference to the first aspect, in a first possible implementation manner, the method further includes: determining a distance from a second pixel in the second image to the Gaussian mixture model; and when the distance from the second pixel to the Gaussian mixture model is greater than a second preset threshold, determining that the second pixel belongs to a foreground area of the second image.

With reference to the first aspect, in a second possible implementation manner, the method further includes: determining an expectation vector of a character vector of a pixel in the first area of the first image; determining an orthogonal coordinate space according to the expectation vector, where a direction of the expectation vector is one direction of the orthogonal coordinate space; determining a projection, of a second pixel in the second image, in the orthogonal coordinate space, where the projection includes a first value, a second value, and a third value, and the first value is a projection, of the second pixel, in the direction of the expectation vector; and when the first value is less than the second value or the first value is less than the third value, determining that the second pixel belongs to a foreground area of the second image.

With reference to the first possible implementation manner, in a third possible implementation manner, when the distance from the first pixel to the Gaussian mixture model is greater than the first threshold, it is determined that the first pixel belongs to a pending area of the second image; and when the distance from the second pixel to the Gaussian mixture model is less than or equal to the second threshold, it is determined that the second pixel belongs to the pending area of the second image.

With reference to the second possible implementation manner, in a fourth possible implementation manner, when the distance from the first pixel to the Gaussian mixture model is greater than the first threshold, it is determined that the first pixel belongs to a pending area of the second image; and when the first value is greater than the second value and the first value is greater than the third value, it is determined that the second pixel belongs to the pending area of the second image.

With reference to the third or the fourth possible implementation manner, in a fifth possible implementation manner, the method further includes: acquiring a fourth pixel in the pending area of the second image; and determining, by using a K-nearest-neighbor algorithm, whether the fourth pixel belongs to the foreground or background area of the second image.

With reference to the fifth possible implementation manner, in a sixth possible implementation manner, the determining, by using a K-nearest-neighbor algorithm, whether the fourth pixel belongs to the foreground or background area of the second image includes: calculating, according to a character vector of the fourth pixel, a character vector of a pixel that belongs to the background area of the second image, and a character vector of a pixel that belongs to the foreground area of the second image, a distance between the fourth pixel and the pixel that belongs to the background area of the second image, and a distance between the fourth pixel and the pixel that belongs to the foreground area of the second image, where an eigenspace corresponding to the character vector of the fourth pixel, the character vector of the pixel that belongs to the background area of the second image, and the character vector of the pixel that belongs to the foreground area of the second image includes at least: red green blue RGB color information of a pixel, position information of a pixel, and oriented gradient information of a pixel; determining k pixels closest to the fourth pixel, where k is a positive integer; and when the k pixels all belong to the foreground area of the second image, determining that the fourth pixel belongs to the foreground area of the second image; or, when the k pixels all belong to the background area of the second image, determining that the fourth pixel belongs to the background area of the second image.

With reference to the first aspect or any possible implementation manner of the first to the sixth possible implementation manners, in a seventh possible implementation manner, the distance from the first pixel to the Gaussian mixture model is represented as:

$$d = \min_{m \in [1,M]} \left[ \hat{D}(w_m, \Sigma_m) + \overline{D}(\vec{P}_{rgb}, \mu_m, \Sigma_m) \right],$$

$$\text{where } \hat{D}(w_m, \Sigma_m) = -\log_2 w_m + \frac{1}{2}\log_2 \det \Sigma_m, \text{ and}$$

$$\overline{D}(\vec{P}_{rgb}, \mu_m, \Sigma_m) = \frac{1}{2}(\vec{P}_{rgb} - \mu_m)^T \sum_m^{-1} (\vec{P}_{rgb} - \mu_m),$$

where $(w_m, \mu_m, \Sigma_m)$ represents an $m^{th}$ Gaussian model in the Gaussian mixture model, and $w_m$, $\mu_m$, and $\Sigma_m$ represent a weight, a median, and a covariance matrix of the $m^{th}$ Gaussian model in the Gaussian mixture model, respectively; and $\vec{P}_{rgb}$ represents a character vector of the first pixel.

With reference to the first aspect or any possible implementation manner of the first to the seventh possible implementation manners, in an eighth possible implementation manner, the first area is determined according to an instruction input by a user.

With reference to the first aspect or any possible implementation manner of the first to the eighth possible implementation manners, in a ninth possible implementation manner, the second image is any frame of image in the video.

According to a second aspect, an image processing apparatus is provided, where the apparatus includes: a first determining unit, configured to determine a Gaussian mixture model of a first area in a first image, where the first area belongs to a background area of the first image, and the first image is a first frame of image in a video, where the first determining unit is further configured to determine a distance from a first pixel in a second image to the Gaussian mixture model; and a second determining unit, configured to: when the distance from the first pixel to the Gaussian mixture model is less than or equal to a first preset threshold, determine that the first pixel belongs to a background area of the second image.

With reference to the second aspect, in a first possible implementation manner of the second aspect, the first determining unit is further configured to determine a distance from a second pixel in the second image to the Gaussian mixture model; and the second determining unit is further configured to: when the distance from the second pixel to the Gaussian mixture model is greater than a second preset threshold, determine that the second pixel belongs to a foreground area of the second image.

With reference to the second aspect, in a second possible implementation manner of the second aspect, the apparatus further includes: a third determining unit, configured to: determine an expectation vector of a character vector of a pixel in the first area of the first image; determine an orthogonal coordinate space according to the expectation vector, where a direction of the expectation vector is one direction of the orthogonal coordinate space; and determine a projection, of a second pixel in the second image, in the orthogonal coordinate space, where the projection includes a first value, a second value, and a third value, and the first value is a projection, of the second pixel, in the direction of the expectation vector, where the second determining unit is further configured to: when the first value is less than the second value or the first value is less than the third value, determine that the second pixel belongs to a foreground area of the second image.

With reference to the first possible implementation manner of the second aspect, in a third possible implementation manner of the second aspect, the second determining unit is further configured to: when the distance from the first pixel to the Gaussian mixture model is greater than the first threshold, determine that the first pixel belongs to a pending area of the second image; and when the distance from the second pixel to the Gaussian mixture model is less than or equal to the second threshold, determine that the second pixel belongs to the pending area of the second image.

With reference to the second possible implementation manner of the second aspect, in a fourth possible implementation manner of the second aspect, the second determining unit is further configured to: when the distance from the first pixel to the Gaussian mixture model is greater than the first threshold, determine that the first pixel belongs to a pending area of the second image; and when the first value is greater than the second value and the first value is greater than the third value, determine that the second pixel belongs to the pending area of the second image.

With reference to the third or the fourth possible implementation manner of the second aspect, in a fifth possible implementation manner of the second aspect, the apparatus further includes: an acquiring unit, configured to acquire a fourth pixel in the pending area of the second image, where the second determining unit is further configured to: determine, by using a K-nearest-neighbor algorithm, whether the fourth pixel belongs to the foreground or background area of the second image.

With reference to the fifth possible implementation manner of the second aspect, in a sixth possible implementation manner of the second aspect, the second determining unit is specifically configured to: calculate, according to a character vector of the fourth pixel, a character vector of a pixel that belongs to the background area of the second image, and a character vector of a pixel that belongs to the foreground area of the second image, a distance between the fourth pixel and the pixel that belongs to the background area of the second image, and a distance between the fourth pixel and the pixel that belongs to the foreground area of the second image, where an eigenspace corresponding to the character vector of the fourth pixel, the character vector of the pixel that belongs to the background area of the second image, and the character vector of the pixel that belongs to the foreground area of the second image includes at least: red green blue RGB color information of a pixel, position information of a pixel, and oriented gradient information of a pixel; determine k pixels closest to the fourth pixel, where k is a positive integer; and when the k pixels all belong to the foreground area of the second image, determine that the fourth pixel belongs to the foreground area of the second image; or, when the k pixels all belong to the background area of the second image, determine that the fourth pixel belongs to the background area of the second image.

With reference to the second aspect or any possible implementation manner of the first to the sixth possible implementation manners of the second aspect, in a seventh possible implementation manner, the distance from the first pixel to the Gaussian mixture model is represented as:

$$d = \min_{m \in [1,M]} [\hat{D}(w_m, \Sigma_m) + \overline{D}(\vec{P}_{rgb}, \mu_m, \Sigma_m)],$$

where $\hat{D}(w_m, \Sigma_m) = -\log_2 w_m + \frac{1}{2}\log_2 \det\Sigma_m$, and $$\overline{D}(\vec{P}_{rgb}, \mu_m, \Sigma_m) = \frac{1}{2}(\vec{P}_{rgb} - \mu_m)^T \sum_m^{-1} (\vec{P}_{rgb} - \mu_m),$$

Where $(w_m, \mu_m, \Sigma_m)$ represents an $m^{th}$ Gaussian model in the Gaussian mixture model, and $w_m$, $\mu_m$, and $\Sigma_m$ represent a weight, a median, and a covariance matrix of the $m^{th}$ Gaussian model in the Gaussian mixture model, respectively; and $\vec{P}_{rgb}$ represents a character vector of the first pixel.

With reference to the second aspect or any possible implementation manner of the first to the seventh possible implementation manners of the second aspect, in an eighth possible implementation manner, the first area is determined according to an instruction input by a user.

With reference to the second aspect or any possible implementation manner of the first to the eighth possible implementation manners of the second aspect, in a ninth possible implementation manner, the second image is any frame of image in the video.

Based on the foregoing technical solutions, a distance from a pixel in an image to a Gaussian model of a background area is determined, and when the distance is less than or equal to a preset threshold, it is determined that the pixel belongs to the background area; an area to which the pixel belongs can be directly determined according to the distance from the pixel to the Gaussian mixture model, so that image foreground segmentation can be completed efficiently.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

Figure 1:
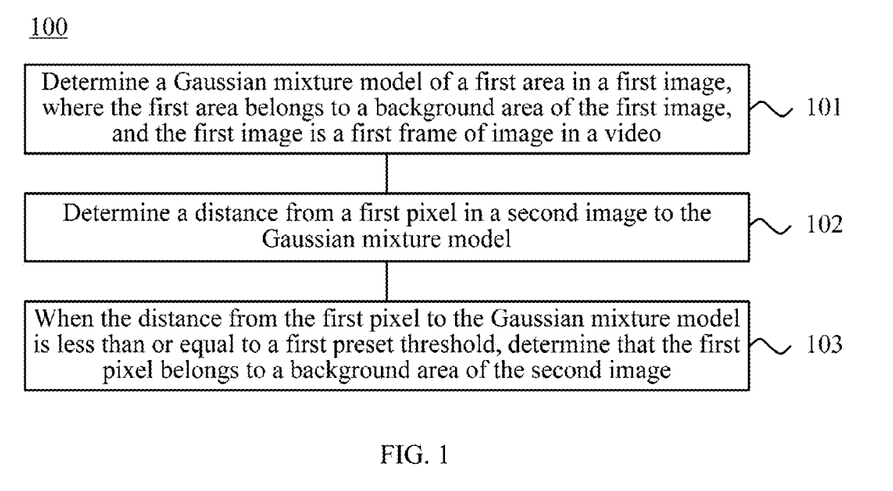
FIG. 1 is a schematic flowchart of an image processing method according to an embodiment of the present invention.

FIG. 1 is a schematic flowchart of an image processing method 100 according to an embodiment of the present invention. The method 100 may be executed by an image processing apparatus. As shown in FIG. 1, the method 100 includes the following content.

101: Determine a Gaussian mixture model of a first area in a first image, where the first area belongs to a background area of the first image, and the first image is a first frame of image in a video.

Figure 2:
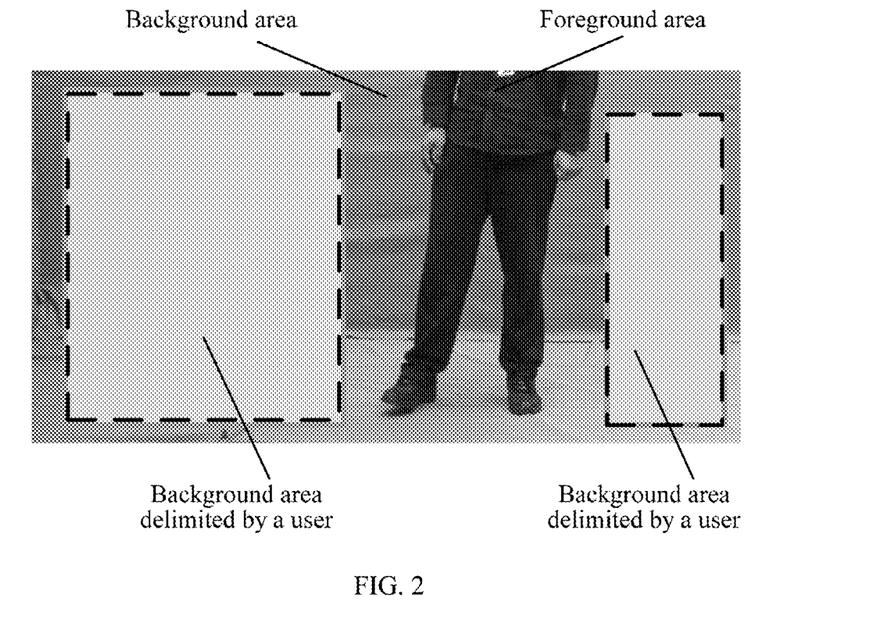
FIG. 2 is a schematic diagram of an initiated image of an image processing method according to an embodiment of the present invention.

The first area is determined, in a process of initializing the first image, according to an instruction input by a user. For example: the background area may be determined according to an instruction input by the user in the first frame of image in the video. The user may delimit a background area in the image, where dashed boxes shown in FIG. 2 are background areas delimited by the user. Preferably, the background area delimited by the user should include as much background information as possible and some special information: such as a wrinkle portion, a shadow portion, and a light and shade alteration area.

102: Determine a distance from a first pixel in a second image to the Gaussian mixture model.

It should be understood that, the second image may be any frame of image in the video.

103: When the distance from the first pixel to the Gaussian mixture model is less than or equal to a first preset threshold, determine that the first pixel belongs to a background area of the second image.

In addition, when the distance from the first pixel to the Gaussian mixture model is greater than the first threshold, it may be determined that the first pixel belongs to a pending area of the second image.

In this embodiment of the present invention, an $m^{th}$ Gaussian model in the Gaussian mixture model may be represented as $(w_m, \mu_m, \Sigma_m)$, where $m \in [1, M]$, and M is a positive integer, for example, M=3. $w_m$, $\mu_m$, and $\Sigma_m$ represent a weight, a median, and a covariance matrix of the $m^{th}$ Gaussian model in the Gaussian mixture model, respectively. In step 102, the distance from the first pixel to the Gaussian mixture model refers to a minimum distance among distances from the first pixel to the M Gaussian models. It should be noted that, $\mu_m$ may also represent a mean value of the $m^{th}$ Gaussian model, which is not limited in this embodiment of the present invention.

It should be understood that, a background model may be estimated by using a simple Gaussian model (that is, M=1). In this case, when light and shade of the background and colors of the background do not change obviously, an ideal effect may also be achieved.

The first threshold may be selected by referring to any frame of image having a foreground, where the first threshold should meet that the delimited background area may not include all background areas in the image, but there is no error in a background pixel obtained through delimitation.

If no pixel of a current frame is set as the background erroneously, the first threshold should be appropriately increased in a next frame of image. As the first threshold increases, an increasing quantity of pixels may be determined erroneously. Conservatively, the selection of the threshold may satisfy that: the threshold is a half or two thirds of a maximum threshold that can be reached when no pixel is determined erroneously.

Therefore, in the image processing method in this embodiment of the present invention, a distance from a pixel in an image to a Gaussian mixture model of a background area is determined, and when the distance is less than or equal to a preset threshold, it is determined that the pixel belongs to the background area; an area to which the pixel belongs can be directly determined according to the distance from the pixel to the Gaussian mixture model, so that image foreground segmentation can be completed efficiently.

In this embodiment of the present invention, when the second image is an image other than the first frame of image in the video, the Gaussian model for the first frame of image in the video is still used for the second image. This means that, in this embodiment of the present invention, the user only needs to assist in inputting information into the first frame of image in the video, and all subsequent processing is automatically completed by the image processing apparatus according to the Gaussian model of the first frame of image. This can reduce manual assistant inputs, has a small workload, and achieves high efficiency and universality.

However, in the prior art, a foreground segmentation technology based on a solid-color background video requires a large quantity of manual assistant inputs. For example: one key frame (key frame) is extracted at an interval of multiple frames (for example, 10 frames), a precise image matting mask is manually generated for each key frame, and then image matting is performed on a remaining frame by using an image matting result of the key frames, which needs a large quantity of manual assistant inputs, has a large workload and low efficiency, and lacks universality.

In this embodiment of the present invention, the method 100 may further include: determining a distance from a second pixel in the second image to the Gaussian mixture model; and when the distance from the second pixel to the Gaussian mixture model is greater than a second preset threshold, determining that the second pixel belongs to a foreground area of the second image.

In addition, when the distance from the first pixel to the Gaussian mixture model is less than the second threshold, it may be determined that the first pixel belongs to a pending area of the second image.

In this embodiment of the present invention, according to a distance from a pixel in an image to the Gaussian mixture model, an area to which the pixel belongs in the image can be efficiently determined.

Specifically, in this embodiment of the present invention, in 102, the distance from the first pixel to the Gaussian mixture model may be determined according to a Mahalanobis distance. The distance from the first pixel to the Gaussian mixture model may be represented as:

$$d = \min_{m \in [1,M]} \left[ \hat{D}(w_m, \Sigma_m) + \overline{D}(\vec{P}_{rgb}, \mu_m, \Sigma_m) \right]$$

where $\hat{D}(w_m, \Sigma_m) = -\log_2 w_m + \frac{1}{2}\log_2 \det\Sigma_m$, and $$\overline{D}(\vec{P}_{rgb}, \mu_m, \Sigma_m) = \frac{1}{2}(\vec{P}_{rgb} - \mu_m)^T \sum_m^{-1} (\vec{P}_{rgb} - \mu_m),$$

where $(w_m, \mu_m, \Sigma_m)$ represents the Gaussian mixture model, $w_m$, $\mu_m$, and $\Sigma_m$ represent a weight, a median, and a covariance matrix of the $m^{th}$ Gaussian model, respectively, $\vec{P}_{rgb}$ represents a character vector of the first pixel, $\hat{D}(w_m, \Sigma_m)$ represents a weight of each Gaussian model and an impact of a Gaussian shape in the Gaussian mixture model, $\overline{D}(\vec{P}_{rgb}, \mu_m, \Sigma_m)$ represents the Mahalanobis distance, and $\vec{P}_{rgb} = [P_r, P_g, P_b]^T$, where $P_r$, $P_g$, and $P_b$ represent pixel values of red, green, and blue components of the first pixel, respectively.

It should be understood that, for any pixel, that is, an $i^{th}$ pixel, a distance from the $i^{th}$ pixel to the Gaussian mixture model may be represented as:

$$d(i) = \min_{m \in [1,M]} \left[ \hat{D}(w_m, \Sigma_m) + \overline{D}(\vec{P}_{rgb}^i, \mu_m, \Sigma_m) \right],$$

where $\hat{D}(w_m, \Sigma_m) = -\log_2 w_m + \frac{1}{2}\log_2 \det\Sigma_m$, and $$\overline{D}(\vec{P}_{rgb}^i, \mu_m, \Sigma_m) = \frac{1}{2}(\vec{P}_{rgb}^i - \mu_m)^T \sum_m^{-1} (\vec{P}_{rgb}^i - \mu_m).$$

It should be noted that, a person skilled in the art may further determine the distance from the first pixel to the Gaussian mixture model by using another method, which is not limited in this embodiment of the present invention.

In this embodiment of the present invention, calculation of a distance from a first pixel to a Gaussian mixture model by using a Mahalanobis distance is more accurate than calculation by using another method, and can make delimitation of a background area more accurate, thereby obtaining a more precise trimap.

Figure 3:
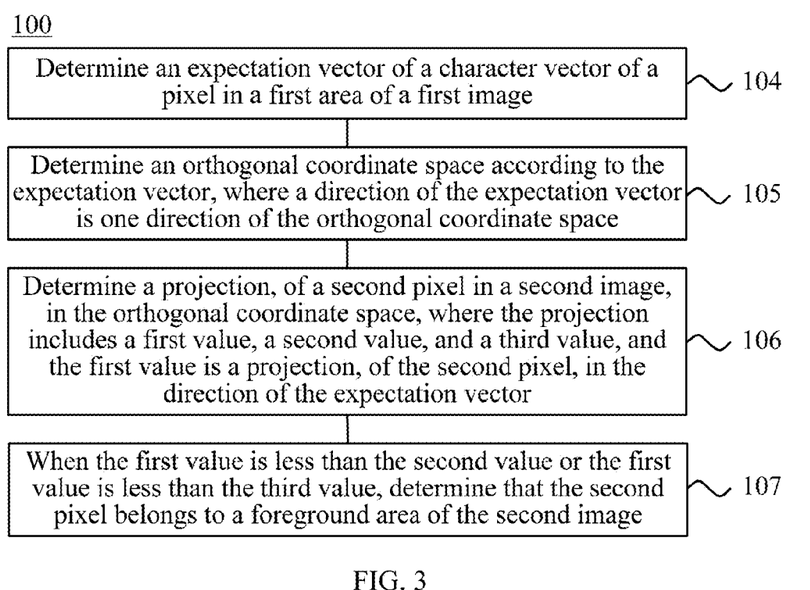
FIG. 3 is a schematic flowchart of an image processing method according to another embodiment of the present invention.

FIG. 3 is a schematic flowchart of an image processing method 100 according to another embodiment of the present invention. As shown in FIG. 3, after step 103, the method 100 may further include:

104: Determine an expectation vector of a character vector of a pixel in the first area of the first image.

A character vector of a pixel in the background area of the first image may be represented as: $\vec{P}_{rgb}^{i\ T} = [P_r^i, P_g^i, P_b^i]$, where i represents a pixel, $P_r^i$, $P_g^i$, and $P_b^i$ represent pixel values of red green blue RGB components of the $i^{th}$ pixel, respectively.

The expectation vector may be represented as:

$$E[\vec{P}_{rgb}^i] = \frac{\sum_i^N \vec{P}_{rgb}^i}{N},$$

and a color corresponding to the expectation vector $E[\vec{P}_{rgb}^i]$ is approximately equal to a color value of a solid-color background in the image.

105: Determine an orthogonal coordinate space according to the expectation vector, where a direction of the expectation vector is one direction of the orthogonal coordinate space.

Specifically, a first unit vector $\vec{u}_1$ corresponding to the expectation vector is first determined, where the first unit vector may be represented as:

$$\vec{u}_1 = \frac{E[\vec{P}_{rgb}^i]}{\left| E[\vec{P}_{rgb}^i] \right|}.$$

Then, a second unit vector $\vec{u}_2$ and a third unit vector $\vec{u}_3$ that are perpendicular to the first unit vector are determined, where the second unit vector and the third unit vector are perpendicular to each other. The first unit vector $\vec{u}_1$, the second unit vector $\vec{u}_2$, and the third unit vector $\vec{u}_3$ may form a new orthogonal coordinate space. Selection of $\vec{u}_2$ and $\vec{u}_3$ is not described particularly, and there are multiple choices available for $\vec{u}_2$ and $\vec{u}_3$ provided that the selected unit vectors satisfy that $\vec{u}_1 \perp \vec{u}_2 \perp \vec{u}_3$. A matrix $U=[\vec{u}_1,\vec{u}_2,\vec{u}_3]$ is a unitary matrix, and may satisfy the following property: $U \cdot U^T = U^T \cdot U = I$.

106: Determine a projection, of a second pixel in the second image, in the orthogonal coordinate space, where the projection includes a first value, a second value, and a third value, and the first value is a projection, of the second pixel, in the direction of the expectation vector.

A vector $\vec{P}_{rgb}^{\,i}$ is projected to the new coordinate space constituted by $\vec{u}_1$, $\vec{u}_2$, and $\vec{u}_3$:

$$\vec{P}_{u123}^{\,i} = U^T \cdot \vec{P}_{rgb}^{\,i} = \begin{bmatrix} P_{u1}^i \\ P_{u2}^i \\ P_{u3}^i \end{bmatrix},$$

and the three unit vectors $\vec{u}_1$, $\vec{u}_2$, and $\vec{u}_3$ of the new orthogonal coordinate space correspond to three colors of the original red green blue coordinate space, respectively.

107: When the first value is less than the second value or the first value is less than the third value, determine that the second pixel belongs to a foreground area of the second image.

That is, for the $i^{th}$ pixel, $\max\{P_{u1}^i, P_{u2}^i, P_{u3}^i\}$ represents a background color, and if $P_{u1}^i \neq \max\{P_{u1}^i, P_{u2}^i, P_{u3}^i\}$, it indicates that the $i^{th}$ pixel does not belong to the background area of the second image, and the $i^{th}$ pixel is assigned to a foreground set: $i \in S_{foreground}$.

In this embodiment of the present invention, a new orthogonal coordinate space is determined, and a pixel that belongs to a foreground is determined according to a projection, of a character vector of the pixel in an image, in the new orthogonal coordinate space; therefore, the method 100 can be universally used in different solid-color backgrounds.

Figure 4:
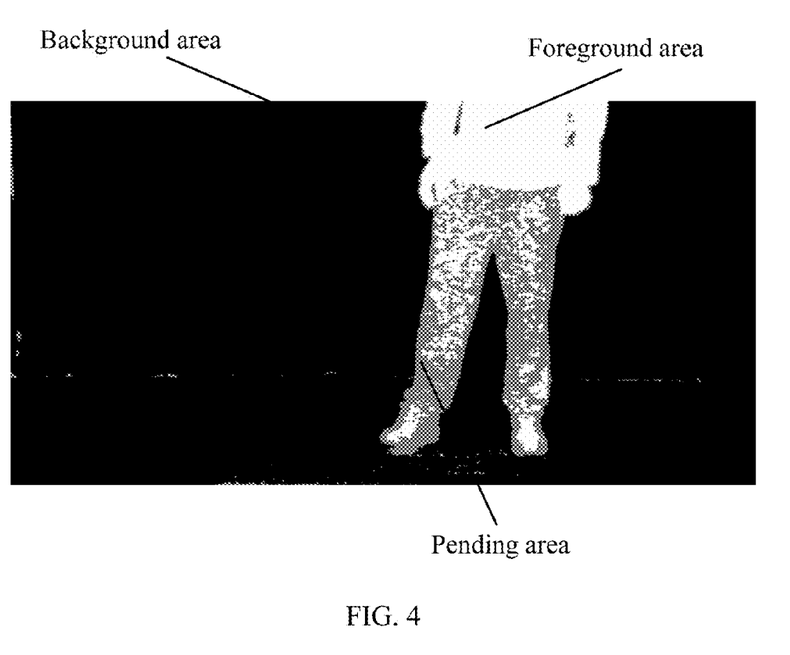
FIG. 4 is a schematic diagram of a preliminary trimap obtained using an image processing method according to another embodiment of the present invention.

In the foregoing embodiment, a preliminary trimap can be obtained. As shown in FIG. 4, the black color in the trimap represents a background area, the white color represents a foreground area, and the gray color represents a pending area. Next, optimization further needs to be performed by using a machine learning method, such as a maximum likelihood (ML) method, a maximum a posteriori method (Maximum a Posteriori, MAP), or a K-nearest-neighbor method (K-Nearest-Neighbor, KNN), to further reduce a size of the pending area. The following describes, with reference to FIG. 5, a process of optimization by using only the K-nearest-neighbor method as an example.

Figure 5:
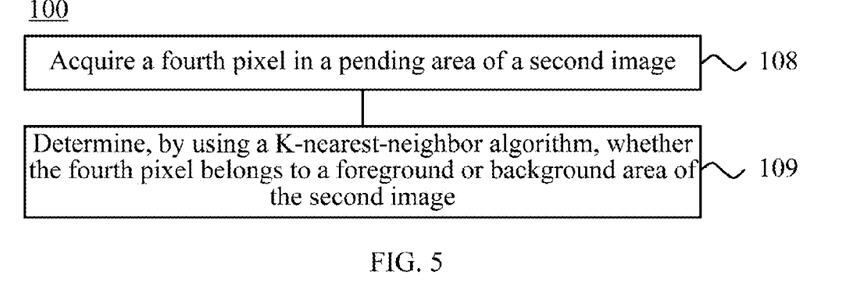
FIG. 5 is a schematic flowchart of an image processing method according to another embodiment of the present invention.

FIG. 5 shows a schematic flowchart of an image processing method 100 according to another embodiment of the present invention. As shown in FIG. 5, after step 103 or step 107, the method 100 may further include:

108: Acquire a fourth pixel in a pending area of the second image.

109: Determine, by using a K-nearest-neighbor algorithm, whether the fourth pixel belongs to the foreground or background area of the second image.

Specifically, 109 may include: first calculating, according to a character vector of the fourth pixel, a character vector of a pixel that belongs to the background area of the second image, and a character vector of a pixel that belongs to the foreground area of the second image, a distance between the fourth pixel and the pixel that belongs to the background area of the second image, and a distance between the fourth pixel and the pixel that belongs to the foreground area of the second image, where an eigenspace corresponding to the character vector of the fourth pixel, the character vector of the pixel that belongs to the background area of the second image, and the character vector of the pixel that belongs to the foreground area of the second image includes at least: red green blue RGB color information of a pixel, position information of a pixel, and oriented gradient information of a pixel.

The RGB color information of a pixel may be pixel values of red, green, and blue components of the pixel, and a character vector of an $i^{th}$ pixel may be represented as $\vec{P}_{new}^{\,i}=[P_r^i,P_g^i,P_b^i,x^i,y^i,\nabla x^i,\nabla y^i]^T$, where $P_r^i,P_g^i,P_b^i$ represent pixel values of red, green, and blue components of the $i^{th}$ pixel, respectively, $x^i$, $y^i$ represent horizontal and vertical coordinates of the $i^{th}$ pixel in the image, respectively, and $\nabla x^i$, $\nabla y^i$ are direction gradients of the horizontal and vertical coordinates of the $i^{th}$ pixel in the image, respectively. It should be noted that, $\nabla x^i$, $\nabla y^i$ are based on a grayscale image, and before an x/y direction derivative is solved, an original color image of an $n^{th}$ frame in the video needs to be converted into a grayscale image first. If the color image is not converted into the grayscale image, the direction gradients $\nabla x^i$ and $\nabla y^i$ need to be separately solved for three portions, namely, a red portion, a green portion, and a blue portion, and a final effect is undesirable. An $i^{th}$ pixel in the $n^{th}$ frame is represented as $n^i$, and a grayscale value may be solved according to the following formula: $I_{gray}^{n^i}(x^i,y^i) = P_{gray}^i = 0.299*P_r^i + 0.587*P_g^i + 0.114*P_b^i$. After a position n of a frame in which the pixel is located and horizontal and vertical coordinates x and y of the pixel are determined, an index value i of the pixel is uniquely determined, that is, $(n^i,x^i,y^i)$ and i are in a one-to-one correspondence. A first-order derivative in the x direction $\nabla x^i = I_{gray}^{n^i}(x^i+1,y^i) - I_{gray}^{n^i}(x^i,y^i)$ can be obtained, and similarly, a first-order derivative in they direction $\nabla y^i = I_{gray}^{n^i}(x^i,y^i+1) + I_{gray}^{n^i}(x^i,y^i)$ can be obtained.

Alternatively, the eigenspace corresponding to the character vector of the fourth pixel, the character vector of the pixel that belongs to the background area of the second image, and the character vector of the pixel that belongs to the foreground area of the second image may further include information about a relative position, of an image in which a pixel is located, in the video, for example, information about a position of the second image relative to a reference frame (for example, the first frame). For example, when the first frame in the video is the reference frame, the information about the relative position of the second image in the video may be a frame number $Index_{frame}$ of a current frame, that is, the character vector of the $i^{th}$ pixel may be represented as $\vec{P}_{new}^{\,i}=[P_r^i,P_g^i,P_b^i,x^i,y^i,\nabla x^i,\nabla y^i,Index_{frame}]^T$.

Then, k pixels closest to the fourth pixel are determined, where k is a positive integer.

When the k pixels all belong to the foreground area of the second image, it is determined that the fourth pixel belongs to the foreground area of the second image; or, when the k pixels all belong to the background area of the second image, it is determined that the fourth pixel belongs to the background area of the second image.

That is, for each pending pixel $i^{un}$, where it is unknown whether the pending pixel $i^{un}$ belongs to the foreground or background, distances from a character vector $\vec{P}_{new}^{\,i^{un}}$ of the pixel to character vectors $\vec{P}_{new}^{\,i^{fg}}$ and $\vec{P}_{new}^{\,i^{bg}}$ of all other determined foreground pixels and background pixels in this frame of image are calculated: $d(\vec{P}_{new}^{\,i^{un}}, \vec{P}_{new}^{\,i^{bg/fg}}) = \|\vec{P}_{new}^{\,i^{un}} - \vec{P}_{new}^{\,i^{bg/fg}}\|_2^2$. After character vectors of all foreground or background pixels are traversed, k pixels closest to the pending pixel $i^{un}$ are selected. When the k pixels are all belong to the foreground or background, the pixel $i^{un}$, where it is unknown whether the pixel $i^{un}$ belongs to the foreground or background, is assigned to the foreground area or the background area.

It should be noted that, if not all k nearest pixels belong to the foreground or background area of the second image, the operation may not be performed.

Figure 6:
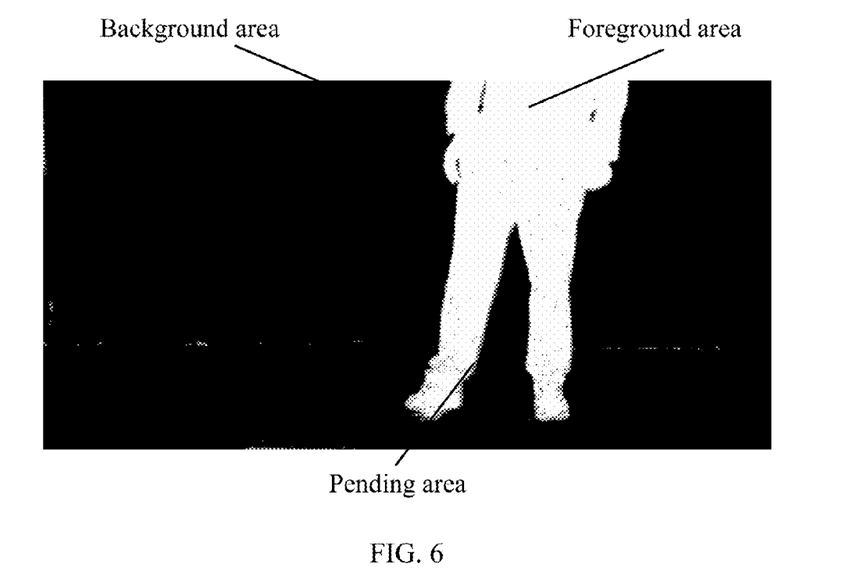
FIG. 6 is a schematic diagram of a final trimap obtained using an image processing method according to another embodiment of the present invention.

After all pending pixels $i^{un}$ are traversed, as shown in FIG. 6, a final trimap can be obtained.

By performing the foregoing steps on each frame of image of the video, an extremely precise trimap is obtained, so that a final image matting mask and matte image can be obtained by using the trimap and multiple existing mature image matting algorithms.

In this embodiment of the present invention, a three-dimensional eigenspace that embodies a pixel is upgraded to a multidimensional eigenspace, that is, a pixel character vector is upgraded from original $\vec{P}_{rgb}^{\,i} = [P_r^i, P_g^i, P_b^i]^T$ to $\vec{P}_{new}^{\,i} = [P_r^i, P_g^i, P_b^i, x^i, y^i, \nabla x^i, \nabla y^i]^T$, and then a size of a pending area is further reduced by using a KNN algorithm, so that image foreground segmentation with higher precision can be implemented.

It should be understood that sequence numbers of the foregoing processes do not mean execution sequences. The execution sequences of the processes should be determined according to functions and internal logic of the processes, and should not be construed as any limitation on the implementation processes of the embodiments of the present invention.

The foregoing describes the image processing methods according to the embodiments of the present invention in detail with reference to FIG. 1 to FIG. 6, and the following describes image processing apparatuses according to the embodiments of the present invention in detail with reference to FIG. 7 to FIG. 10.

Figure 7:
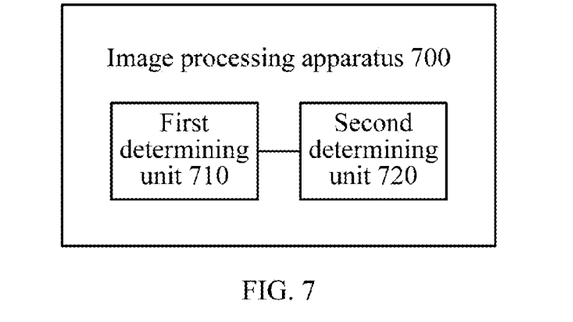
FIG. 7 is a schematic block diagram of an image processing apparatus according to an embodiment of the present invention.

FIG. 7 is a schematic block diagram of an image processing apparatus 700 according to an embodiment of the present invention. As shown in FIG. 7, the apparatus 700 includes: a first determining unit 710 and a second determining unit 720.

The first determining unit 710 is configured to determine a Gaussian mixture model of a first area in a first image, where the first area belongs to a background area of the first image, and the first image is a first frame of image in a video.

The first area may be determined according to an instruction input by a user.

The first determining unit 710 is further configured to determine a distance from a first pixel in a second image to the Gaussian mixture model.

An $m^{th}$ Gaussian model in the Gaussian mixture model may be represented as $(w_m, \mu_m, \Sigma_m)$, where $m \in [1, M]$, and M is a positive integer, for example, M=3, and $w_m$, $\mu_m$, and $\Sigma_m$ represent a weight, a median, and a covariance matrix of the $m^{th}$ Gaussian model in the Gaussian mixture model, respectively.

The second determining unit 720 is configured to: when the distance from the first pixel to the Gaussian mixture model is less than or equal to a first preset threshold, determine that the first pixel belongs to a background area of the second image.

Therefore, in the image processing apparatus in this embodiment of the present invention, a distance from a pixel in an image to a Gaussian mixture model of a background area is determined, and when the distance is less than or equal to a preset threshold, it is determined that the pixel belongs to the background area; an area to which the pixel belongs can be directly determined according to the distance from the pixel to the Gaussian mixture model, so that image foreground segmentation can be completed efficiently.

In this embodiment of the present invention, when the second image is an image other than the first frame of image in the video, the Gaussian model for the background area of the first frame of image in the video is still used for the second image. This means that, in this embodiment of the present invention, the user only needs to assist in inputting information into the first frame of image in the video, and all subsequent processing is automatically completed by the image processing apparatus according to the Gaussian model of the first frame of image. This can reduce manual assistant inputs, has a small workload, and achieves high efficiency and universality.

The distance from the first pixel to the Gaussian mixture model may be represented as:

$$d = \min_{m \in [1,M]} \left[ \hat{D}(w_m, \Sigma_m) + \overline{D}(\vec{P}_{rgb}, \mu_m, \Sigma_m) \right],$$

where $\hat{D}(w_m, \Sigma_m) = -\log_2 w_m + \frac{1}{2}\log_2 \det\Sigma_m$, and $$\overline{D}(\vec{P}_{rgb}, \mu_m, \Sigma_m) = \frac{1}{2}(\vec{P}_{rgb} - \mu_m)^T \sum_m^{-1}(\vec{P}_{rgb} - \mu_m),$$

where $(w_m, \mu_m, \Sigma_m)$ represents an $m^{th}$ Gaussian model in the Gaussian mixture model, and $w_m$, $\mu_m$, and $\Sigma_m$ represent a weight, a median, and a covariance matrix of the $m^{th}$ Gaussian model in the Gaussian mixture model, respectively; and $\vec{P}_{rgb}$ represents the first character vector; $\hat{D}(w_m, \Sigma_m)$ represents a weight of each Gaussian model and an impact of a Gaussian shape in the Gaussian mixture model; $\overline{D}(\vec{P}_{rgb}^{\,i}, \mu_m, \Sigma_m)$ represents a Mahalanobis distance; and $\vec{P}_{rgb}^{\,T} = [P_r, P_g, P_b]$, where $P_r$, $P_g$, and $P_b$ represent pixel values of red, green, and blue components of the first pixel, respectively.

It should be understood that, for any pixel, that is, an $i^{th}$ pixel, a distance from the $i^{th}$ pixel to the Gaussian mixture model may be represented as:

$$d(i) = \min_{m \in [1,M]} \left[ \hat{D}(w_m, \Sigma_m) + \overline{D}(\vec{P}_{rgb}^{\,i}, \mu_m, \Sigma_m) \right],$$

where $\hat{D}(w_m, \Sigma_m) = -\log w_m + \frac{1}{2}\log\det\Sigma_m$, and $$\overline{D}(\vec{P}_{rgb}^{\,i}, \mu_m, \Sigma_m) = \frac{1}{2}(\vec{P}_{rgb}^{\,i} - \mu_m)^T \sum_m^{-1}(\vec{P}_{rgb}^{\,i} - \mu_m).$$

It should be noted that, a person skilled in the art may further determine the distance from the first pixel to the Gaussian mixture model by using another method, which is not limited in this embodiment of the present invention.

In this embodiment of the present invention, calculation of a distance from a first pixel to a Gaussian mixture model by using a Mahalanobis distance is more accurate than calculation by using another method, and can make delimitation of a background area more accurate, thereby obtaining a more precise trimap.

Alternatively, in another embodiment of the present invention, the first determining unit 710 is further configured to determine a distance from a second pixel in the second image to the Gaussian mixture model. The second determining unit 720 is further configured to: when the distance from the second pixel to the Gaussian mixture model is greater than a second preset threshold, determine that the second pixel belongs to a foreground area of the second image.

The second determining unit 720 may be further configured to: when the distance from the first pixel to the Gaussian mixture model is greater than the first threshold, determine that the first pixel belongs to a pending area of the second image; and when the distance from the second pixel to the Gaussian mixture model is less than or equal to the second threshold, determine that the second pixel belongs to the pending area of the second image.

Figure 8:
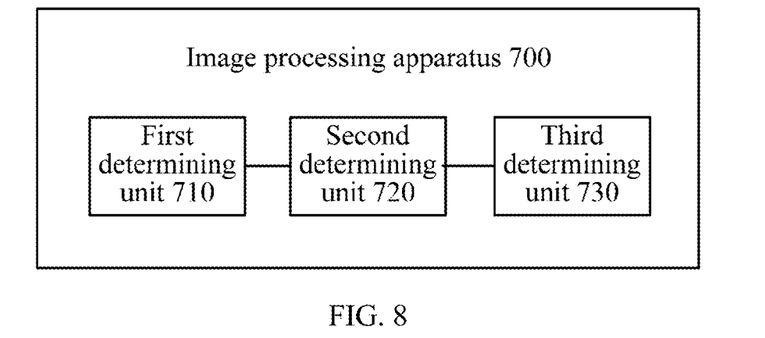
FIG. 8 is a schematic block diagram of an image processing apparatus according to another embodiment of the present invention.

Alternatively, in another embodiment of the present invention, as shown in FIG. 8, the apparatus 700 may further include: a third determining unit 730, configured to: determine an expectation vector of a character vector of a pixel in the first area of the first image; determine an orthogonal coordinate space according to the expectation vector, where a direction of the expectation vector is one direction of the orthogonal coordinate space; and determine a projection, of a second pixel in the second image, in the orthogonal coordinate space, where the projection includes a first value, a second value, and a third value, and the first value is a projection, of the second pixel, in the direction of the expectation vector. The second determining unit 720 is further configured to: when the first value is less than the second value or the first value is less than the third value, determine that the second pixel belongs to a foreground area of the second image.

The second determining unit 720 may be further configured to: when the distance from the first pixel to the Gaussian mixture model is greater than the first threshold, determine that the first pixel belongs to a pending area of the second image; and when the first value is greater than the second value and the first value is greater than the third value, determine that the second pixel belongs to the pending area of the second image.

In this embodiment of the present invention, a new orthogonal coordinate space is determined, and a pixel that belongs to a foreground is determined according to a projection, of a character vector of the pixel in an image, in the new orthogonal coordinate space; therefore, the method 100 can be universally used in different solid-color backgrounds.

Figure 9:
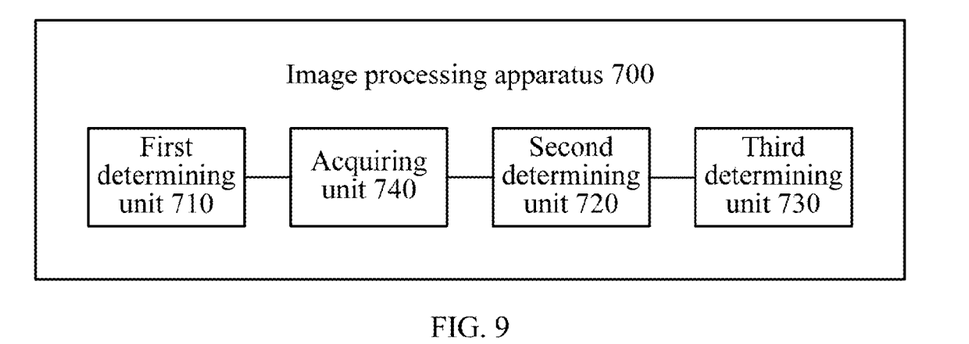
FIG. 9 is a schematic block diagram of an image processing apparatus according to another embodiment of the present invention.

Alternatively, in another embodiment of the present invention, as shown in FIG. 9, the apparatus 700 may further include: an acquiring unit 740, configured to acquire a fourth pixel in the pending area of the second image. The second determining unit 720 is further configured to: determine, by using a K-nearest-neighbor algorithm, whether the fourth pixel belongs to the foreground or background area of the second image.

The second determining unit 720 may be specifically configured to: calculate, according to a character vector of the fourth pixel, a character vector of a pixel that belongs to the background area of the second image, and a character vector of a pixel that belongs to the foreground area of the second image, a distance between the fourth pixel and the pixel that belongs to the background area of the second image, and a distance between the fourth pixel and the pixel that belongs to the foreground area of the second image, where an eigenspace corresponding to the character vector of the fourth pixel, the character vector of the pixel that belongs to the background area of the second image, and the character vector of the pixel that belongs to the foreground area of the second image includes at least: red green blue RGB color information of a pixel, position information of a pixel, and oriented gradient information of a pixel; determine k pixels closest to the fourth pixel, where k is a positive integer; and when the k pixels all belong to the foreground area of the second image, determine that the fourth pixel belongs to the foreground area of the second image; or, when the k pixels all belong to the background area of the second image, determine that the fourth pixel belongs to the background area of the second image.

In this embodiment of the present invention, a three-dimensional eigenspace that embodies a pixel is upgraded to a multidimensional eigenspace, that is, a pixel character vector is upgraded from original $\vec{P}_{rgb}{}^i = [P_r{}^i, P_g{}^i, P_b{}^i]^T$ to $\vec{P}_{new}{}^i = [P_r{}^i, P_g{}^i, P_b{}^i, x^i, y^i, \nabla x^i, \nabla y^i]^T$, and then a size of a pending area is further reduced by using a KNN algorithm, so that image foreground segmentation with higher precision can be implemented.

It should be understood that, the image processing apparatus 700 according to this embodiment of the present invention may correspond to the image processing apparatus in the image processing method 100 according to the embodiments of the present invention, and the foregoing and other operations and/or functions of modules in the apparatus 700 are separately used to implement corresponding procedures of the methods 100 in FIG. 1 to FIG. 6. For the purpose of brief description, details are not described herein again.

Figure 10:
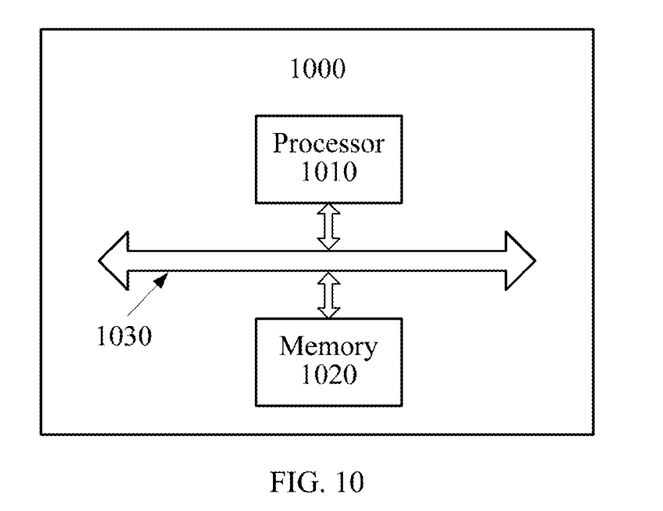
FIG. 10 is a schematic block diagram of an image processing apparatus according to another embodiment of the present invention.

FIG. 10 is a schematic block diagram of an image processing apparatus 1000 according to another embodiment of the present invention. As shown in FIG. 10, the apparatus 1000 includes a processor 1010, a memory 1020 and a bus system 1030. The processor 1010 and the memory 1020 are connected by using the bus system 1030, the memory 1020 is configured to store an instruction, and the processor 1010 is configured to execute the instruction stored in the memory 1020.

The processor 1010 is configured to determine a Gaussian mixture model of a first area in a first image, where the first area belongs to a background area of the first image, and the first image is a first frame of image in a video; determine a distance from a first pixel in a second image to the Gaussian mixture model; and when the distance from the first pixel to the Gaussian mixture model is less than or equal to a first preset threshold, determine that the first pixel belongs to a background area of the second image.

Therefore, in the image processing apparatus in this embodiment of the present invention, a distance from a pixel in an image to a Gaussian mixture model of a background area is determined, and when the distance is less than or equal to a preset threshold, it is determined that the pixel belongs to the background area; an area to which the pixel belongs can be directly determined according to the distance from the pixel to the Gaussian mixture model, so that image foreground segmentation can be completed efficiently.

It should be understood that, in this embodiment of the present invention, the processor 1010 may be a central processing unit (Central Processing Unit, CPU), where the processor 1010 may also be another general processor, digital signal processor (DSP), application-specific integrated circuit (ASIC), field-programmable gate array (FPGA), or another programmable logic device, independent gate or transistor logic device, independent hardware component, and the like. The general processor may be a microprocessor or the processor may also be any common processor, and the like.

The memory 1020 may include a read-only memory and a random access memory, and provide an instruction and data for the processor 1010. A part of the memory 1020 may further include a non-volatile random access memory. For example, the memory 1020 may further store information about a device type.

The bus system 1030, besides including a data bus, may further include a power bus, a control bus, a status signal bus, and on the like. However, for the purpose of clear description, all buses are marked as the bus system 1030 in the figure.

In an implementation process, each step of the method may be completed by using an integrated logic circuit of hardware in the processor 1010 or an instruction in a software form. Steps of the methods disclosed with reference to the embodiments of the present invention may be directly embodied as being executed by a hardware processor or by a combination of hardware in the processor and software modules. The software modules may be located in a mature storage medium in the art, such as a random access memory, a flash memory, a read-only memory, a programmable read-only memory, an electronically erasable programmable memory, or a register. The storage medium is located in the memory 1020, and the processor 1010 reads information in the memory 1020, and completes the steps of the method in combination with hardware thereof. To avoid repetition, detailed description is not provided herein again.

In this embodiment of the present invention, the first area may be determined according to an instruction input by a user. The second image may be any frame of image in the video.

Specifically, the processor 1010 may be further configured to: when the distance from the first pixel to the Gaussian mixture model is greater than the first threshold, determine that the first pixel belongs to a pending area of the second image.

The distance from the first pixel to the Gaussian mixture model may be represented as:

$$d = \min_{m \in [1,M]} \left[ \hat{D}(w_m, \Sigma_m) + \overline{D}(\vec{P}_{rgb}, \mu_m, \Sigma_m) \right],$$

where $\hat{D}(w_m, \Sigma_m) = -\log_2 w_m + \frac{1}{2}\log_2 \det\Sigma_m$, and $$\overline{D}(\vec{P}_{rgb}, \mu_m, \Sigma_m) = \frac{1}{2}(\vec{P}_{rgb} - \mu_m)^T \sum_m^{-1}(\vec{P}_{rgb} - \mu_m),$$

where $(w_m, \mu_m, \Sigma_m)$ represents an $m^{th}$ Gaussian model in the Gaussian mixture model, and $w_m$, $\mu_m$, and $\Sigma_m$ represent a weight, a median, and a covariance matrix of the $m^{th}$ Gaussian model in the Gaussian mixture model, respectively; and $\vec{P}_{rgb}^i$ represents the first character vector of the first pixel.

Alternatively, in another embodiment of the present invention, the processor 1010 may be further configured to: determine a distance from a second pixel in the second image to the Gaussian mixture model; and when the distance from the second pixel to the Gaussian mixture model is greater than a second preset threshold, determine that the second pixel belongs to a foreground area of the second image.

The processor 1010 may be further configured to: when the distance from the second pixel to the Gaussian mixture model is less than or equal to the second threshold, determine that the second pixel belongs to the pending area of the second image.

Alternatively, in another embodiment of the present invention, the processor 1010 may be further configured to: determine an expectation vector of a character vector of a pixel in the first area of the first image; determine an orthogonal coordinate space according to the expectation vector, where a direction of the expectation vector is one direction of the orthogonal coordinate space; determine a projection, of a second pixel in the second image, in the orthogonal coordinate space, where the projection includes a first value, a second value, and a third value, and the first value is a projection, of the second pixel, in the direction of the expectation vector; and when the first value is less than the second value or the first value is less than the third value, determine that the second pixel belongs to a foreground area of the second image.

The processor 1010 may be further configured to: when the first value is greater than the second value and the first value is greater than the third value, determine that the second pixel belongs to a pending area of the second image.

Alternatively, in another embodiment of the present invention, the processor 1010 may be further configured to: acquire a fourth pixel in the pending area of the second image; and determine, by using a K-nearest-neighbor algorithm, whether the fourth pixel belongs to the foreground or background area of the second image.

The processor 1010 may be specifically configured to: calculate, according to a character vector of the fourth pixel, a character vector of a pixel that belongs to the background area of the second image, and a character vector of a pixel that belongs to the foreground area of the second image, a distance between the fourth pixel and the pixel that belongs to the background area of the second image, and a distance between the fourth pixel and the pixel that belongs to the foreground area of the second image, where an eigenspace corresponding to the character vector of the fourth pixel, the character vector of the pixel that belongs to the background area of the second image, and the character vector of the pixel that belongs to the foreground area of the second image includes at least: red green blue RGB color information of a pixel, position information of a pixel, and oriented gradient information of a pixel; determine k pixels closest to the fourth pixel, where k is a positive integer; and when the k pixels all belong to the foreground area of the second image, determine that the fourth pixel belongs to the foreground area of the second image; or, when the k pixels all belong to the background area of the second image, determine that the fourth pixel belongs to the background area of the second image.

It should be understood that, the image processing apparatus 1000 according to this embodiment of the present invention may correspond to the image processing apparatus in the image processing method 100 and the image processing apparatus 700 according to the embodiments of the present invention, and the foregoing and other operations and/or functions of modules in the apparatus 1000 are separately used to implement corresponding procedures of the methods 100 in FIG. 1 to FIG. 6. For the purpose of brief description, details are not described herein again.

Therefore, in the image processing apparatus in this embodiment of the present invention, a distance from a pixel in an image to a Gaussian mixture model of a background area is determined, and when the distance is less than or equal to a preset threshold, it is determined that the pixel belongs to the background area; an area to which the pixel belongs can be directly determined according to the distance from the pixel to the Gaussian mixture model, so that image foreground segmentation can be completed efficiently.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An image processing method, comprising:
   determining a Gaussian mixture model of a first area in a first image, wherein the first area belongs to a background area of the first image, and the first image is a first frame of an image in a video, wherein the Gaussian mixture model of the first area represents a probability distribution of pixels in the first area;
   determining a probabilistic distance from a first pixel in a second image to the Gaussian mixture model;
   when the probabilistic distance from the first pixel to the Gaussian mixture model is less than or equal to a first preset threshold, determining that the first pixel belongs to a background area of the second imaged; and
   performing image foreground segmentation on pixels in the second image based on the determining that the first pixel belongs to the background area of the second image.

2. The method according to claim 1, further comprising:
   determining a probabilistic distance from a second pixel in the second image to the Gaussian mixture model; and
   when the probabilistic distance from the second pixel to the Gaussian mixture model is greater than a second preset threshold, determining that the second pixel belongs to a foreground area of the second image, wherein the performing image foreground segmentation includes performing image foreground segmentation on pixels in the second image based on the determining that the second pixel belongs to the foreground area of the second image.

3. The method according to claim 2, further comprising:
   when the probabilistic distance from the first pixel to the Gaussian mixture model is greater than the first threshold, it is determined that the first pixel belongs to a pending area of the second image; and
   when the probabilistic distance from the second pixel to the Gaussian mixture model is less than or equal to the second threshold, it is determined that the second pixel belongs to the pending area of the second image.

4. The method according to claim 3, further comprising:
   acquiring a fourth pixel in the pending area of the second image; and
   determining, using a K-nearest-neighbor algorithm, whether the fourth pixel belongs to the foreground or background area of the second image.

5. The method according to claim 4, wherein the determining, using a K-nearest-neighbor algorithm, whether the fourth pixel belongs to the foreground or background area of the second image comprises:
calculating, according to a character vector of the fourth pixel, a character vector of a pixel that belongs to the background area of the second image, and a character vector of a pixel that belongs to the foreground area of the second image, a distance between the fourth pixel and the pixel that belongs to the background area of the second image, and a distance between the fourth pixel and the pixel that belongs to the foreground area of the second image, wherein an eigenspace corresponding to the character vector of the fourth pixel, the character vector of the pixel that belongs to the background area of the second image, and the character vector of the pixel that belongs to the foreground area of the second image each comprises at least: Red Green Blue (RGB) color information of a pixel, position information of a pixel, and oriented gradient information of a pixel;
determining k pixels closest to the fourth pixel, wherein k is a positive integer; and
when the k pixels all belong to the foreground area of the second image, determining that the fourth pixel belongs to the foreground area of the second image; or,
when the k pixels all belong to the background area of the second image, determining that the fourth pixel belongs to the background area of the second image.

6. The method according to claim 1, further comprising:
determining an expectation vector of a character vector of a pixel in the first area of the first image;
determining an orthogonal coordinate space according to the expectation vector, wherein a direction of the expectation vector is one direction of the orthogonal coordinate space;
determining a projection, of a second pixel in the second image, in the orthogonal coordinate space, wherein the projection comprises a first value, a second value, and a third value, and the first value is a projection, of the second pixel, in the direction of the expectation vector; and
when the first value is less than the second value or the first value is less than the third value, determining that the second pixel belongs to a foreground area of the second image.

7. The method according to claim 6, wherein when the probabilistic distance from the first pixel to the Gaussian mixture model is greater than the first threshold, it is determined that the first pixel belongs to a pending area of the second image; and
when the first value is greater than the second value and the first value is greater than the third value, it is determined that the second pixel belongs to the pending area of the second image.

8. The method according to claim 1, wherein the probabilistic distance from the first pixel to the Gaussian mixture model is represented as:

$$d = \min_{m \in [1,M]} \left[ \hat{D}(w_m, \Sigma_m) + \overline{D}(\vec{P}_{rgb}, \mu_m, \Sigma_m) \right],$$

wherein $\hat{D}(w_m, \Sigma_m) = -\log_2 w_m + \frac{1}{2}\log_2 \det \Sigma_m$, and $$\overline{D}(\vec{P}_{rgb}, \mu_m, \Sigma_m) = \frac{1}{2}(\vec{P}_{rgb} - \mu_m)^T \sum_m^{-1} (\vec{P}_{rgb} - \mu_m),$$

wherein $(w_m, \mu_m, \Sigma_m)$ represents an $m^{th}$ Gaussian model in the Gaussian mixture model, M is a positive integer, and $w_m$, $\mu_m$, and $\Sigma_m$ represent a weight matrix, a median matrix, and a covariance matrix of the $m^{th}$ Gaussian model in the Gaussian mixture model, respectively; and $\vec{P}_{rgb}$ represents a character vector of the first pixel, and $\vec{P}_{rgb} = [P_r, P_g, P_b]^T$, where $P_r$, $P_g$, and $P_b$ represent pixel values of red, green, and blue components of the first pixel, respectively.

9. The method according to claim 1, wherein the first area is determined according to an instruction input by a user.

10. The method according to claim 1, wherein the second image is any frame of an image in the video other than the first frame.

11. An image processing apparatus, comprising a processor and a non-transitory processor-readable medium having processor-executable instructions stored thereon, the processor-executable instructions including a plurality of units, the units including:
a first determining unit, configured to determine a Gaussian mixture model of a first area in a first image, wherein the first area belongs to a background area of the first image, and the first image is a first frame of an image in a video, wherein
the first determining unit is further configured to determine a probabilistic distance from a first pixel in a second image to the Gaussian mixture model; and
a second determining unit, configured to: when the probabilistic distance from the first pixel to the Gaussian mixture model is less than or equal to a first preset threshold, determine that the first pixel belongs to a background area of the second image; and
an image foreground segmentation unit configured to perform image foreground segmentation on pixels in the second image based on the determining that the first pixel belongs to the background area of the second image.

12. The image processing apparatus according to claim 11, wherein the first determining unit is further configured to determine a probabilistic distance from a second pixel in the second image to the Gaussian mixture model; and
the second determining unit is further configured to: when the probabilistic distance from the second pixel to the Gaussian mixture model is greater than a second preset threshold, determine that the second pixel belongs to a foreground area of the second image; and
the image foreground segmentation unit is further configured to perform image foreground segmentation on pixels in the second image based on the determining that the second pixel belongs to the foreground area of the second image.

13. The image processing apparatus according to claim 12, wherein the second determining unit is further configured to: when the probabilistic distance from the first pixel to the Gaussian mixture model is greater than the first threshold, determine that the first pixel belongs to a pending area of the second image; and when the probabilistic distance from the second pixel to the Gaussian mixture model is less than or equal to the second threshold, determine that the second pixel belongs to the pending area of the second image.

14. The image processing apparatus according to claim 13, the processor-executable instructions further comprising:
an acquiring unit, configured to acquire a fourth pixel in the pending area of the second image;

wherein the second determining unit is further configured to: determine, using a K-nearest-neighbor algorithm, whether the fourth pixel belongs to the foreground or background area of the second image.

15. The image processing apparatus according to claim 14, wherein the second determining unit is configured to:

calculate, according to a character vector of the fourth pixel, a character vector of a pixel that belongs to the background area of the second image, and a character vector of a pixel that belongs to the foreground area of the second image, a distance between the fourth pixel and the pixel that belongs to the background area of the second image, and a distance between the fourth pixel and the pixel that belongs to the foreground area of the second image, wherein an eigenspace corresponding to the character vector of the fourth pixel, the character vector of the pixel that belongs to the background area of the second image, and the character vector of the pixel that belongs to the foreground area of the second image each comprises at least: Red Green Blue (RGB) color information of a pixel, position information of a pixel, and oriented gradient information of a pixel;

determine k pixels closest to the fourth pixel, wherein k is a positive integer; and when the k pixels all belong to the foreground area of the second image, determine that the fourth pixel belongs to the foreground area of the second image; or, when the k pixels all belong to the background area of the second image, determine that the fourth pixel belongs to the background area of the second image.

16. The image processing apparatus according to claim 11, the processor-executable instructions further comprising:

a third determining unit, configured to: determine an expectation vector of a character vector of a pixel in the first area of the first image; determine an orthogonal coordinate space according to the expectation vector, wherein a direction of the expectation vector is one direction of the orthogonal coordinate space; and determine a projection, of a second pixel in the second image, in the orthogonal coordinate space, wherein the projection comprises a first value, a second value, and a third value, and the first value is a projection, of the second pixel, in the direction of the expectation vector, wherein the second determining unit is further configured to: when the first value is less than the second value or the first value is less than the third value, determine that the second pixel belongs to a foreground area of the second image.

17. The image processing apparatus according to claim 16, wherein the second determining unit is further configured to: when the probabilistic distance from the first pixel to the Gaussian mixture model is greater than the first threshold, determine that the first pixel belongs to a pending area of the second image; and when the first value is greater than the second value and the first value is greater than the third value, determine that the second pixel belongs to the pending area of the second image.

18. The image processing apparatus according to claim 11, wherein the probabilistic distance from the first pixel to the Gaussian mixture model is represented as:

$$d = \min_{m \in [1,M]} \left[ \hat{D}(w_m, \Sigma_m) + \overline{D}(\vec{P}_{rgb}, \mu_m, \Sigma_m) \right],$$

wherein $\hat{D}(w_m, \Sigma_m) = -\log w_m + \frac{1}{2} \log \det \Sigma_m$, and $$\overline{D}(\vec{P}_{rgb}, \mu_m, \Sigma_m) = \frac{1}{2} (\vec{P}_{rgb} - \mu_m)^T \sum_m^{-1} (\vec{P}_{rgb} - \mu_m),$$

wherein $(w_m, \mu_m, \Sigma_m)$ represents an $m^{th}$ Gaussian model in the Gaussian mixture model, M is a positive integer, and $w_m$, $\mu_m$, and $\Sigma_m$ represent a weight matrix, a median matrix, and a covariance matrix of the $m^{th}$ Gaussian model in the Gaussian mixture model, respectively; and $\vec{P}_{rgb}^i$ represents a character vector of the first pixel, and $\vec{P}_{rgb} = [P_r, P_g, P_b]^T$, where $P_r$, $P_g$, and $P_b$ represent pixel values of red, green, and blue components of the first pixel, respectively.

19. The image processing apparatus according to claim 11, wherein the first area is determined according to an instruction input by a user.

20. The image processing apparatus according to claim 11, wherein the second image is any frame of an image in the video other than the first frame.

* * * * *

UNITED STATES PATENT AND TRADEMARK OFFICE
CERTIFICATE OF CORRECTION

PATENT NO. : 9,704,261 B2
APPLICATION NO. : 14/941475
DATED : July 11, 2017
INVENTOR(S) : Ji et al.

Page 1 of 1

It is certified that error appears in the above-identified patent and that said Letters Patent is hereby corrected as shown below:

In the Claims

Column 18, Line 35, "imaged" should read -- image --.

Column 19, Line 60, " $d = \min_{m \in [1,M]} [\hat{D}(w_m, \Sigma_m) + \overline{D}(\hat{P}_{rgb}, \mu_m, \Sigma_m)]$, " should read -- $d = \min_{m \in [1,M]} \left[ \hat{D}(w_m, \Sigma_m) + \overline{D}\left(\overline{P}_{rgb}, \mu_m, \Sigma_m\right) \right]$ --.

Column 19, Line 64, " $D(\hat{P}_{rgb}, \mu_m, \Sigma_m) = \frac{1}{2}(\hat{P}_{rgb} - \mu_m)^T \sum_m^{-1} (\hat{P}_{rgb} - \mu_m)$, " should read -- $\overline{D}\left(\overline{P}_{rgb}, \mu_m, \Sigma_m\right) = \frac{1}{2}(\overline{P}_{rgb} - \mu_m)^T \Sigma_m^{-1} (\overline{P}_{rgb} - \mu_m)$ --.

Column 22, Line 20, " $d = \min_{m \in [1,M]} [\hat{D}(w_m, \Sigma_m) + \overline{D}(\hat{P}_{rgb}, \mu_m, \Sigma_m)]$, " should read -- $d = \min_{m \in [1,M]} \left[ \hat{D}(w_m, \Sigma_m) + \overline{D}\left(\overline{P}_{rgb}, \mu_m, \Sigma_m\right) \right]$ --.

Column 22, Line 25, " $D(\hat{P}_{rgb}, \mu_m, \Sigma_m) = \frac{1}{2}(\hat{P}_{rgb} - \mu_m)^T \sum_m^{-1} (\hat{P}_{rgb} - \mu_m)$, " should read -- $\overline{D}\left(\overline{P}_{rgb}, \mu_m, \Sigma_m\right) = \frac{1}{2}(\overline{P}_{rgb} - \mu_m)^T \Sigma_m^{-1} (\overline{P}_{rgb} - \mu_m)$ --.

Signed and Sealed this
Sixteenth Day of October, 2018

Andrei Iancu
*Director of the United States Patent and Trademark Office*